United States Patent
McCarthy et al.

(10) Patent No.: US 8,102,245 B2
(45) Date of Patent: Jan. 24, 2012

(54) METHOD AND APPARATUS FOR TRANSMITTING NOTIFICATION MESSAGES

(75) Inventors: Mary McCarthy, San Antonio, TX (US); Roland Noll, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 501 days.

(21) Appl. No.: 11/457,496

(22) Filed: Jul. 14, 2006

(65) Prior Publication Data

US 2008/0018452 A1    Jan. 24, 2008

(51) Int. Cl.
*G08B 9/00* (2006.01)

(52) U.S. Cl. ............... 340/286.05; 340/286.06; 340/505

(58) Field of Classification Search ............. 340/286.01, 340/500, 506, 539.1, 286.05–286.07, 502–505; 709/206, 229; 713/201, 202; 455/404.1; 379/37
See application file for complete search history.

(56) References Cited

U.S. PATENT DOCUMENTS

| | | | |
|---|---|---|---|
| 6,553,100 B1 * | 4/2003 | Chen et al. ........................ 379/37 |
| 7,221,928 B2 * | 5/2007 | Laird et al. ................. 455/404.1 |
| 7,233,781 B2 * | 6/2007 | Hunter et al. ............... 455/404.1 |
| 2002/0040401 A1 * | 4/2002 | Yasushi et al. ................. 709/229 |
| 2002/0133405 A1 * | 9/2002 | Newnam et al. ................. 705/14 |
| 2002/0133827 A1 * | 9/2002 | Newnam et al. ................. 725/89 |
| 2004/0027244 A9 | 2/2004 | Menard |
| 2005/0037728 A1 | 2/2005 | Binzel et al. |
| 2005/0050148 A1 * | 3/2005 | Mohammadioun et al. .. 709/206 |
| 2005/0151642 A1 | 7/2005 | Tupler et al. |
| 2005/0162267 A1 | 7/2005 | Khandelwal et al. |
| 2006/0040639 A1 | 2/2006 | Karl et al. |
| 2006/0049934 A1 | 3/2006 | Breen |
| 2006/0058004 A1 | 3/2006 | Dolezal et al. |
| 2006/0058005 A1 | 3/2006 | Dolezal et al. |
| 2006/0133582 A1 | 6/2006 | McCulloch |
| 2007/0263780 A1 * | 11/2007 | Lentini .......................... 379/37 |

FOREIGN PATENT DOCUMENTS

WO    2006029306 A1    3/2006

* cited by examiner

*Primary Examiner* — Van T. Trieu
(74) *Attorney, Agent, or Firm* — Guntin Meles & Gust, PLC; Andrew Gust

(57) ABSTRACT

A system can have a storage element that stores contact information for one or more messaging devices of one or more parties associated with an end user, a detection element that detects an emergency call initiated by the end user, and a transmission element that transmits a notice associated with the detected emergency call to at least one among the one or more messaging devices. Additional embodiments are provided.

20 Claims, 3 Drawing Sheets

METHOD AND APPARATUS FOR TRANSMITTING NOTIFICATION MESSAGES

FIELD OF THE DISCLOSURE

The present disclosure relates generally to communication systems, and more specifically to a method and apparatus for transmitting notification messages.

BACKGROUND

Generally, an emergency alert system (EAS) transmits alert messages such as severe weather warnings by way of radio and TV stations. When end users are away from their home or without access to a radio they generally cannot receive EAS alerts directed to their local area. Similarly, when end users make emergency calls (e.g., 911) to an emergency response center, neighbors, friends or family may have no idea that such a call is in progress.

A need therefore arises for a method and apparatus for transmitting notification messages.

DETAILED DESCRIPTION

Embodiments in accordance with the present disclosure provide a method and apparatus for transmitting notification messages.

In a first embodiment of the present disclosure, a computer-readable storage medium can have computer instructions for detecting an emergency broadcast event directed to a targeted Internet Protocol (IP) service subscribed to by an end user, identifying one or more messaging devices of the end user other than those associated with the targeted IP service, and transmitting a notice associated with the emergency broadcast event to at least one among the one or more messaging devices of the end user.

In a second embodiment of the present disclosure, a system can have a storage element that stores contact information for one or more messaging devices of one or more parties associated with an end user, a detection element that detects an emergency call initiated by the end user, and a transmission element that transmits a notice associated with the detected emergency call to at least one among the one or more messaging devices.

In a third embodiment of the present disclosure, a method can have the step of transmitting an emergency notification message to one or more messaging devices of one or more parties associated with an end user in response to detecting one among an emergency call initiated by an end user, and an emergency broadcast event directed to an Internet Protocol (IP) service subscribed to by the end user.

Figure 1:
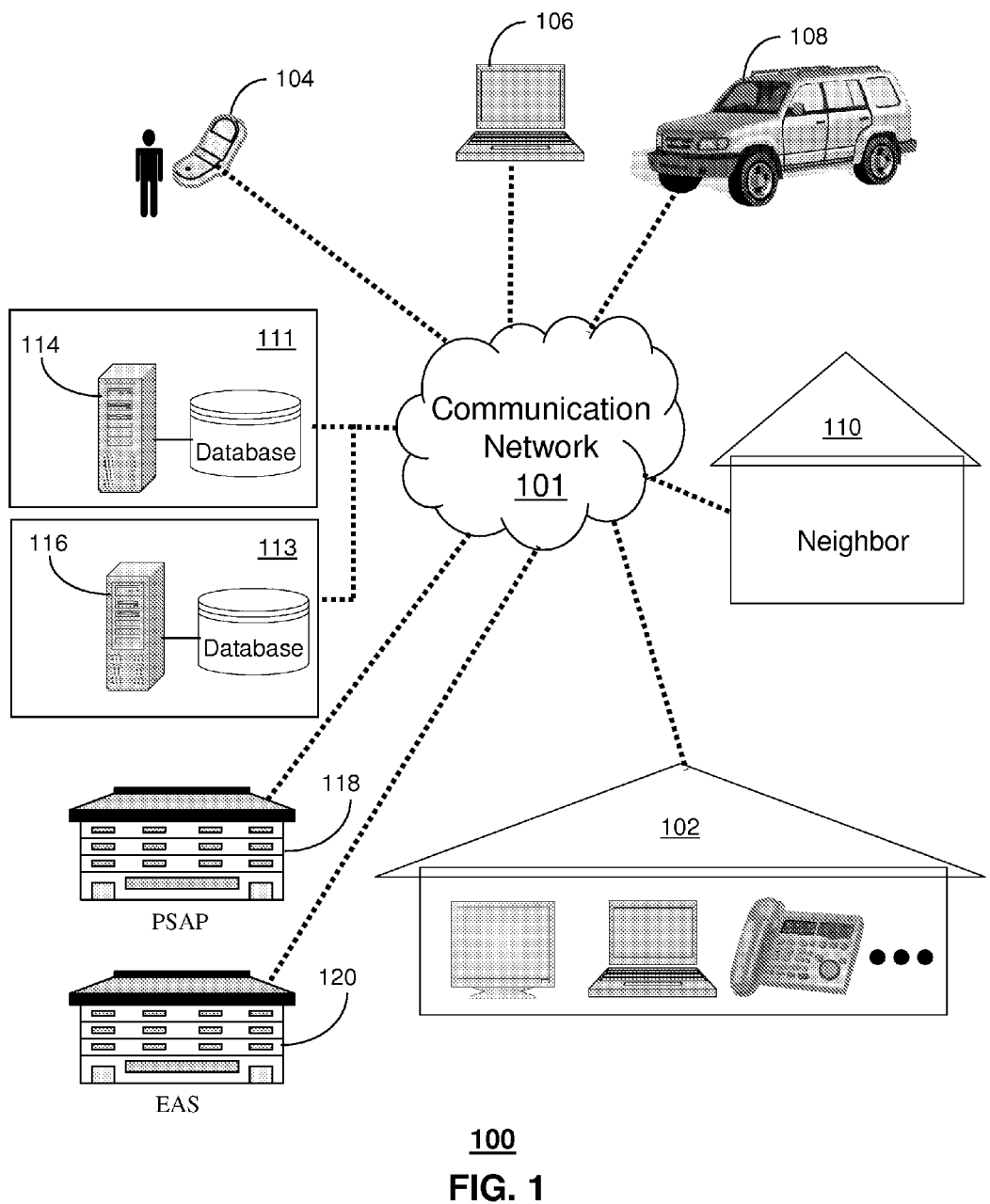
FIG. 1 depicts an exemplary embodiment of a communication system.

FIG. 1 depicts an exemplary embodiment of a communication system 100. The communication 100 can comprise a communication network 101 coupled to a number of communication elements 102-120. The communication network 101 can support packet-switched and circuit-switched wired and wireless services. Consumer and enterprise services provided by the communication network 101 can include IPTV, Voice over IP (VoIP), traditional voice over a Public Switched Telephone Network (PSTN), and cellular wireless roaming services-just to name a few. The communication network 101 can support any number of access technologies such as cable, xDSL, WiFi, WiMAX, Plain Old Telephone Service (POTS), GSM, CDMA, EVDO, UMTS, and so on.

The communication network 101 can be couple to an end user's residence or enterprise by common means such as a central office and service area interface. The service provider of the communication network 101 can offer packet or circuit switched video, data and voice services across a number of devices such as a television (analog or digital), a computer, or a phone terminal. A neighbor 110 can subscribe to similar services of the communication network 101. By way of a wireless interface such as a base station or WiFi access point, the communication network 101 can supply roaming communication services to messaging devices such as a cell phone 104, a laptop computer 106, and/or a telematics system of an automobile 108. Additionally, the communication network 101 can be coupled to a Public Service Access Point (PSAP) 118 and an Emergency Alert Service (EAS) 120 by traditional means such as a central office. The PSAP 118 and the EAS 120 can provide end users of the communication network 101 emergency broadcast and response services.

To manage operations of the communication network 101 in relation to emergency services, the communication system 101 can comprise an emergency system (ES) 111 for managing distribution of emergency notices, and a presence system 113 for supplementing the services provided by the ES 111. The ES 111 can be utilized for directed distribution of emergency notices to parties designated by an end user of such service. Each of the emergency system 111 and the presence system 113 comprise a controller 114, 116 coupled to a memory operating as a database that stores subscriber information. The controllers 114, 116 and memory utilize common scalable computing and storage technologies.

Figure 2:
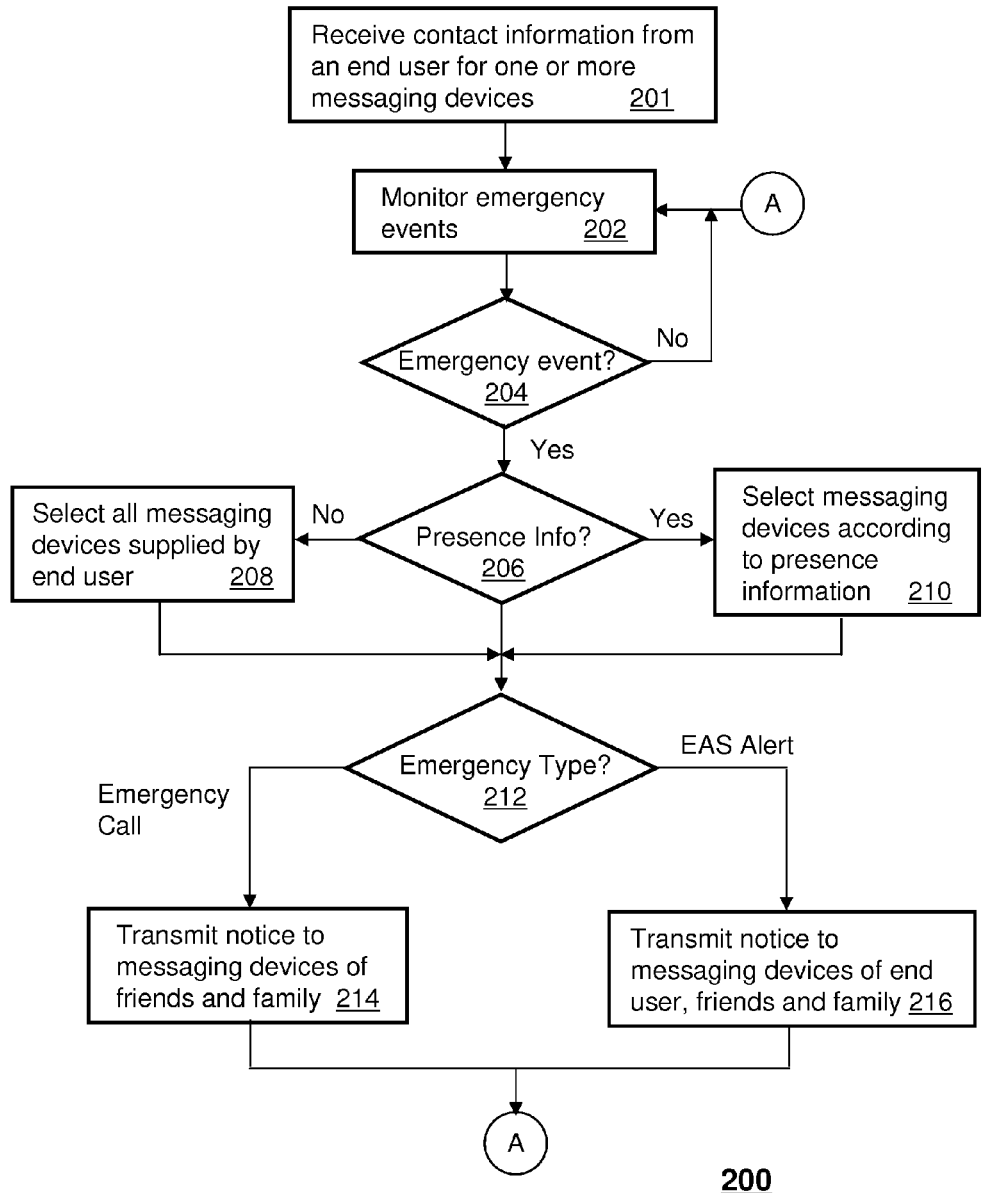
FIG. 2 depicts an exemplary method operating in the communication system.

FIG. 2 depicts an exemplary method 200 operating in the communication system 100. Method 200 begins with step 201 in which the ES 111 receives from an end user of the services supplied by the ES 111 contact information associated with one or more messaging devices. The messaging devices can belong to the end user as well as friends and family. As noted earlier, a messaging device can represent a cell phone, a computer, an IPTV, a VoIP terminal, a POTS terminal, a telematics system in an automobile, or any other conceivable communication device that can be coupled to communication network 101. The contact information can represent an identifier for a messaging device such as a 10 digit dialing number (222-333-4444), an email address, a short message service (SMS) identifier, an IPTV identifier (e.g., such as its Media Access Control or MAC, static IP address, etc.), and so on.

In steps 202-204, the ES 111 monitors emergency events. An emergency event can represent an EAS broadcast (e.g., a tornado warning, severe storm warning, hurricane warning, etc.) directed to an analog or IPTV channel and/or radio station, or an emergency call such as 911 initiated by the end user to PSAP 118. In steps 204-206, the ES 111 can be programmed by common means to monitor and detect any data traffic in the communication network 101 associated with an EAS broadcast or 911 call initiated by the end user.

In a supplemental embodiment, the ES 111 can be programmed in step 206 to check for presence information associated with the messaging devices identified by the end user in step 201. Presence information can be derived from the presence system 113 of FIG. 1, and/or from Global Positioning System (GPS) coordinate information received by the ES 111 directly from one or more of the messaging devices. The presence information can also include device activity information which can be used to hone in on which messaging device is most likely used by a targeted user.

If in step 206 the ES 111 detects the availability of presence information for one or more of the messaging devices identified in step 201, it proceeds to step 210 where it selects one or more messaging devices according to said information. In a case where a number of messaging devices belong to friends and family, the ES 210 will attempt to target messaging devices having a highest likelihood of reaching said users. If on the other hand presence information is not available for any of the messaging devices identified in step 201, then the ES 111 proceeds to step 208 where it selects all messaging device for communicating an emergency notice.

In step 212, the ES 111 determines the type of emergency detected. If it is an emergency call (e.g., 911), the ES 111 transmits in step 214 a notice to messaging devices of friends and family identified by the end user in 201. If step 210 was invoked, then the ES 111 can transmit the notice to a limited number of messaging devices for each of the targeted friends and family. If step 208 was triggered, then the ES 111 will transmit the notice to all the messaging devices identified for each friend and family member identified in step 201.

The notice can be an SMS text message, a synthesized voice recording transmitted to a wired or wireless voice terminal, or a replayed recording of the end user's 911 call with a preview stating for example the day and time when the end user made the call. The voice or text message can also include a response message from the PSAP 118 indicating that an emergency response unit has been called with an estimated time of arrival.

If the emergency event is an EAS alert, the ES 111 can be programmed in step 216 to transmit a notice associated with the EAS alert to the messaging devices of the end user, friends and family. The notice can as before in text and/or a recorded voice or synthesized voice message, and can repeat all or part of the EAS alert. The notice can be transmitted to a wireline or wireless device according to any of the aforementioned communication techniques.

Once the emergency notices have been transmitted, the ES 111 can be programmed to repeat the foregoing process from step 202. The foregoing embodiments of method 200 provide an end user a measure of security not previously found in prior art systems. For example, when an end user is not near his/her residence and an EAS alert has been submitted such as a pending tornado, the ES 111 can be programmed to submitted emergency notices to one or more messaging devices of a neighbor or friends and family, thereby alerting said individuals to assist the end user if he's not there. Such individuals can for instance move a pet indoors, or perform other cautionary preparations.

Similarly, when the end user makes a 911 call, the end user's neighbor and/or friends and family can be notified. This is especially helpful when the end user is known to have a health condition that warrants assistance. Friends or family may have quicker access to the end user than an emergency response system, which may improve the end user's chance to survive a dangerous condition.

It would be evident to an artisan with ordinary skill in the art that the above embodiments can be modified, reduced, or enhanced without departing from the scope and spirit of the claims described below. Accordingly, the reader is directed to the claims below for a fuller understanding of the breadth and scope of the present disclosure.

Figure 3:
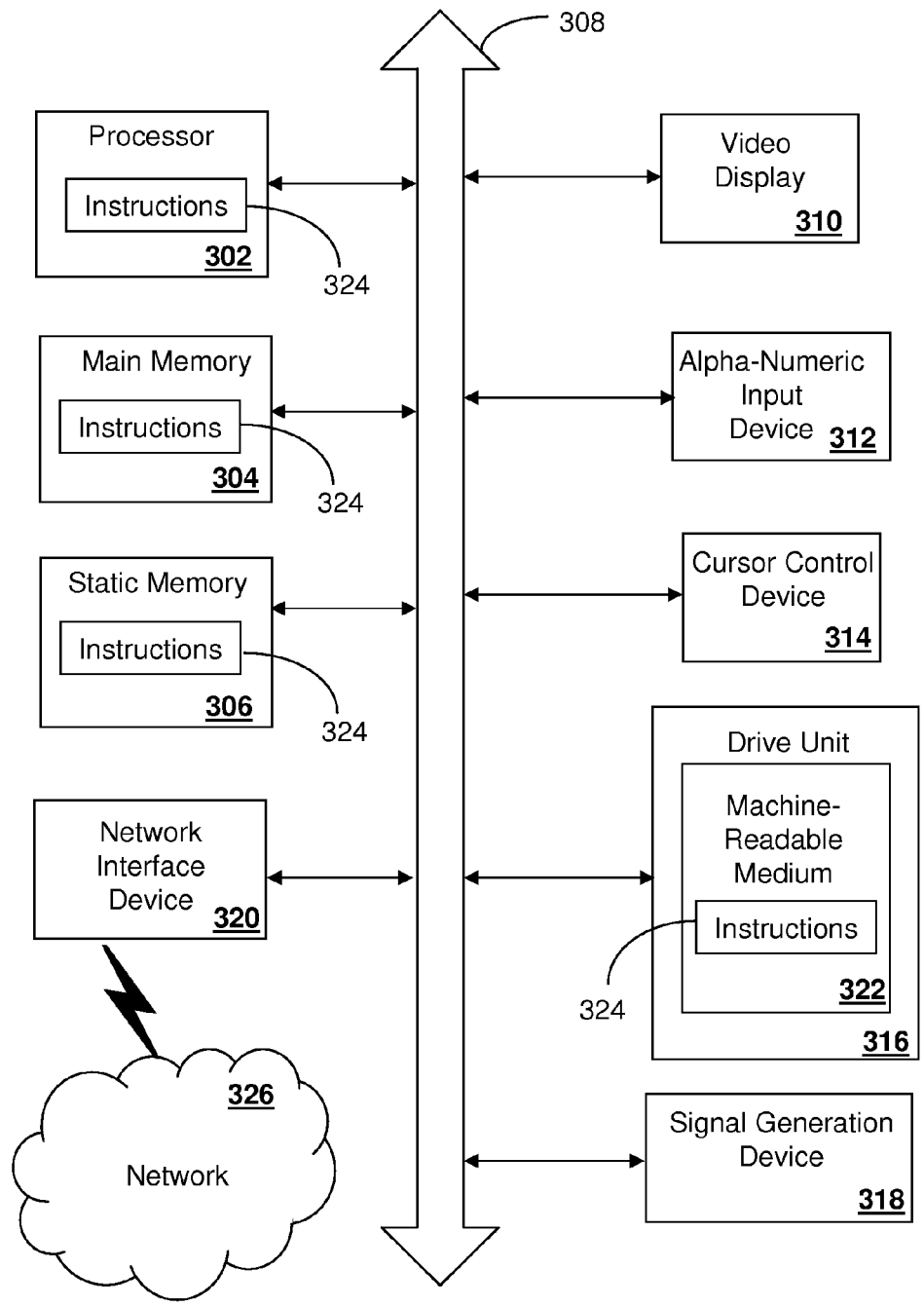
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium, comprising computer instructions for causing a computing device to:
    detect an emergency broadcast event directed to a targeted Internet Protocol (IP) service subscribed to by an end user;
    identify one or more messaging devices of the end user other than those associated with the targeted IP service;
    receive from the end user contact information for one or more messaging devices of one or more parties other than the end user;
    receive presence information associated with the one or more messaging devices of the one or more parties, the presence information comprising device activity information indicating a probability of contacting the party using the messaging device;
    select at least one of the messaging devices according to the presence information;
    transmit a notice associated with the emergency broadcast event to at least one among the one or more messaging devices of the end user; and
    transmit the notice to at least one of the selected messaging devices of the one or more parties.

2. The storage medium of claim 1, wherein each messaging device comprises one among a wireline and wireless communication device.

3. The storage medium of claim 1, comprising computer instructions for causing the computing device to:
    receive presence information associated with the one or more messaging devices of the end user;
    select at least one of the messaging devices according to presence information associated therewith; and
    transmit the notice to at least one of the messaging devices selected.

4. The storage medium of claim 3, wherein the presence information is received from a presence system monitoring activities of the end user by way of the one or more messaging devices of the end user.

5. The storage medium of claim 3, wherein the presence information is received from the one or more messaging devices of the end user.

6. The storage medium of claim 1, comprising computer instructions for causing the computing device to transmit the notice using a SMS text message.

7. The storage medium of claim 1, wherein the targeted IP service comprises one among voice, video and data packet services.

8. The storage medium of claim 1, wherein the emergency broadcast event comprises a broadcast message transmitted by an Emergency Alert System (EAS).

9. A system, comprising a controller to:
store contact information for one or more messaging devices of one or more parties associated with an end user;
detect an emergency call initiated by the end user;
receive presence information associated with the one or more parties, the presence information comprising device activity information indicating a probability of contacting the party using the messaging device;
select at least one of the messaging devices of the one or more parties according to the presence information; and
transmit a notice associated with the detected emergency call to the selected messaging devices of the one or more parties.

10. The system of claim 9, wherein the emergency call comprises a network origination call directed to a Public Service Access Point (PSAP).

11. The system of claim 9, wherein each messaging device comprises one among a wireline and wireless communication device.

12. The system of claim 9, comprising a presence element for receiving presence information associated with the one or more messaging devices.

13. The system of claim 9, wherein the presence information is received from a presence system monitoring activities of the one or more parties.

14. The system of claim 9, wherein the presence information is received from the one or more messaging devices.

15. A method, comprising transmitting an emergency notification message to one or more messaging devices of one or more parties associated with an end user in response to:
detecting one among an emergency call initiated by an end user, and an emergency broadcast event directed to an Internet Protocol (IP) service subscribed to by the end user; and
selecting the one or more messaging devices of the one or more parties according to received presence information associated with the one or more parties, the presence information comprising device activity information indicating a likelihood of the messaging device being used by the party.

16. The method of claim 15, comprising transmitting the emergency notification message to the end user when detecting the emergency broadcast event.

17. The method of claim 15, wherein each messaging device comprises one among a wireline and wireless communication device.

18. The method of claim 15, comprising
receiving presence information associated with the one or more messaging devices.

19. The method of claim 15, comprising providing a recording of the emergency call of the end user when the emergency call is detected as being initiated by the end user.

20. The method of claim 15, wherein the targeted IP service comprises one among Voice over IP (VoIP), IPTV, and Internet services, wherein the emergency broadcast event comprises a broadcast message transmitted by an Emergency Alert System (EAS), and wherein the emergency call comprises a network origination call directed to a Public Service Access Point (PSAP).

* * * * *